J. M. LASATER.
COMBINED FISH-TRAP AND BUCKET.
No. 194,253. Patented Aug. 14, 1877.
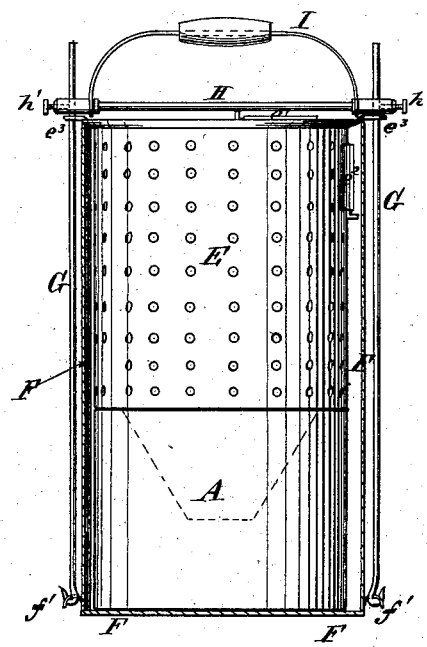
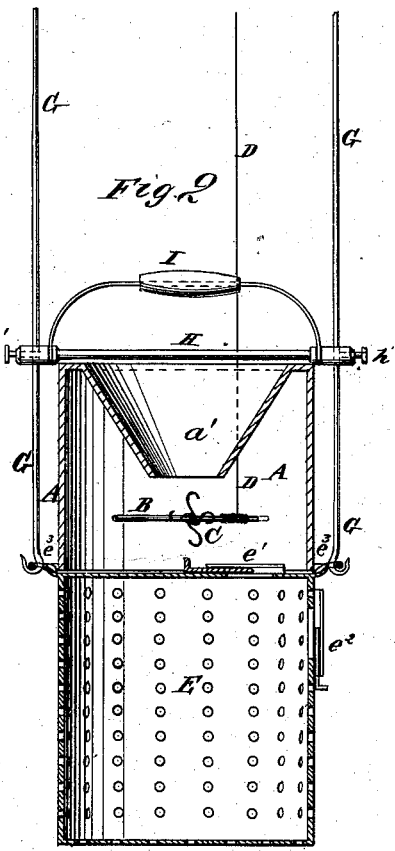
WITNESSES:
A. W. Almqvist
J. H. Scarborough
INVENTOR:
J. M. Lasater.
BY
ATTORNEYS.
N. PETERS, PHOTO-LITHOGRAPHER, WASHINGTON, D. C.

UNITED STATES PATENT OFFICE.

JAMES M. LASATER, OF MANCHESTER, TENNESSEE, ASSIGNOR TO ROBT. L. LASATER, OF SAME PLACE.

IMPROVEMENT IN COMBINED FISH TRAP AND BUCKET.

Specification forming part of Letters Patent No. 194,253, dated August 14, 1877; application filed March 24, 1877.

*To all whom it may concern:*

Be it known that I, JAMES M. LASATER, of Manchester, in the county of Coffee and State of Tennessee, have invented a new and useful Improvement in Combined Fish Trap and Bucket, of which the following is a specification:

Figure 1 is a side view of my improved device arranged for carrying the fish, the bucket being shown in section. Fig. 2 is a vertical section of the same arranged for catching the fish.

Similar letters of reference indicate corresponding parts.

The object of this invention is to furnish an improved device for catching and carrying minnows and other small fish, which shall be simple in construction and convenient in use.

The invention consists in the combination of the glass vessel provided with the funnel-shaped top, the shaft, the bait-hooks, and the cord, the perforated vessel provided with the slides and the eyes, the rods, and the bail, with each other; and in the combination of the glass vessel provided with the funnel-shaped top, the shaft, the bait-hooks, and the cord, the perforated vessel provided with the slides and the eyes, the bucket provided with the eyes, the rods, and the bail, as hereinafter fully described.

A is a glass vessel, made with an open bottom and a funnel-shaped top, $a'$, the opening of which is slightly elongated to allow larger fish to pass through it than could pass through a rounded hole of the same size. B is a shaft, which is pivoted to the sides of the glass vessel A by being passed through holes in its sides, or by screws passing through said holes.

To the shaft B are attached a number of hooks or arms, C, to receive the bait, and to said shaft is attached, and around it is wound, a thread or small cord, D, so that by pulling upon the said cord the bait may be revolved.

The shaft B should be placed at the side of the funnel $a'$, and should be revolved in such a direction that the bait may pass down the side of said funnel to entice the fish to enter the trap. The cord D passes up through a hole in the funnel-top $a'$ of the vessel or trap A.

E is a vessel having its sides and bottom perforated to allow the water to pass through freely, and having a rim around its top to adapt it to serve as a seat for the glass vessel A.

In the top of the vessel E, between its center and edge, is formed a hole to allow the fish to pass from the vessel A into the vessel E, and to enable the fish to be taken out of said vessel E when desired. The hole in the top of the vessel E is closed, when desired, by a slide, $e^1$.

In the side of the vessel E is formed a hole provided with a slide, $e^2$, which may be so adjusted as to allow the small fish, up to a certain size, to escape.

F is a bucket of such a size as to contain the vessels E and A, as shown in Fig. 1. To the lower edges of the bucket F are attached eyes $f'$, and upon the upper edges of the vessel E are formed eyes $e^3$, to receive the rods G, which have hooks formed upon their lower ends.

The rods G are passed through holes in the ends of a cross-rod, H, where they are secured in place adjustably by set-screws $h'$. To the cross-rod H are also secured the ends of the bail I.

When the device is used as a trap the glass vessel A is placed upon the top of the vessel E, and is secured in place by the rods G H.

When the device is used for carrying the fish the glass vessel A is placed in the bottom of the bucket F, the vessel E is placed upon the top of the vessel A, and the three are secured together by the rods G H, the glass vessel being thus protected against accidental breakage.

Having thus described my invention, I claim as new and desire to secure by Letters Patent—

1. The combination of the glass vessel A, provided with the funnel-shaped top $a'$, the shaft B, the bait-hooks C, and the cord D, the perforated vessel E, provided with the slides $e^1$ $e^2$ and the eyes $e^3$, the rods G H, and the bail I, with each other, substantially as herein shown and described.

2. The combination of the glass vessel A, provided with the funnel-shaped top A', the shaft B, the bait-hooks C, and the cord D, the perforated vessel E, provided with the slides $e^1$ $e^2$ and the eyes $e^3$, the bracket F, provided with the eyes $f'$, the rods G H, and the bail I, with each other, substantially as herein shown and described.

JAMES MITCHELL LASATER.

Witnesses:
BYRON POPE,
G. W. FERGESON.